United States Patent [19]
Suzuki

[11] 3,939,394
[45] Feb. 17, 1976

[54] CONSTANT VOLTAGE CIRCUIT

[75] Inventor: Tadao Suzuki, Tokyo, Japan

[73] Assignee: Sony Corporation, Tokyo, Japan

[22] Filed: Sept. 17, 1974

[21] Appl. No.: 506,690

[30] Foreign Application Priority Data

Sept. 20, 1973 Japan............................ 48-106358

[52] U.S. Cl. ..................... 321/18; 307/33; 323/19; 323/22 SC; 323/25; 323/39
[51] Int. Cl.² ......................................... G05F 1/64
[58] Field of Search............ 307/11, 12, 17, 31–34, 307/83, 252 R, 252 N, 252 Q, 296, 297; 321/16, 18, 47; 323/16, 19, 22 SC, 23, 25, 36, 39

[56] References Cited
UNITED STATES PATENTS

| | | | |
|---|---|---|---|
| 3,241,043 | 3/1966 | Clarke | 321/18 X |
| 3,321,692 | 5/1967 | Walsh | 321/18 X |
| 3,418,554 | 12/1968 | Legatti | 321/16 X |
| 3,636,434 | 1/1972 | Beuk et al. | 321/18 X |
| 3,781,632 | 12/1973 | Charboneau | 323/39 X |

Primary Examiner—A. D. Pellinen
Attorney, Agent, or Firm—Lewis H. Eslinger; Alvin Sinderbrand

[57] ABSTRACT

A power supply circuit using a silicon controlled rectifier to rectify alternating voltage and apply the rectified voltage across a capacitor. To obtain one polarity of rectified voltage, the cathode of the SCR is connected to the AC source and the output circuit of a switching transistor is connected in series with the gate of the SCR. The input circuit of the transistor is connected in series with a constant voltage element across the capacitor. The switching semiconductor only conducts when the capacitor discharges to a predetermined level. To obtain the opposite polarity rectified voltage the cathode of the SCR is connected to one terminal of the capacitor and, instead of the semiconductor switch, a constant voltage device is connected between the gate of the SCR and the other terminal of the capacitor so that the SCR conducts only when the voltage across the capacitor drops below the voltage of the constant voltage device.

8 Claims, 9 Drawing Figures

CONSTANT VOLTAGE CIRCUIT

BACKGROUND OF THE INVENTION

This invention relates to the field of constant voltage power supply circuits and particularly to power supply circuits using silicon controlled rectifiers (SCRs) with a constant voltage device to control the gating of the rectifiers.

PRIOR ART

In constant voltage circuits such as those used in power supplies for transistor amplifiers, a diode rectifier is often used. However in the case of constant voltage circuits for amplifiers that have a large power output, there may be a problem of heat generation in the power supply.

The use of SCRs in power supply circuits to furnish large load currents is also common. However there has heretofore been no proposal of a constant voltage circuit using SCRs for large output amplifiers.

Accordingly it is one object of the present invention to provide an improved constant voltage circuit using a thyristor, such as a SCR.

It is another object of the present invention to provide a thyristor constant voltage circuit for an amplifier having high output power.

Still another object of the present invention is to provide a constant voltage power supply circuit in which an SCR serves as a voltage controlled device.

Still another object of the present invention is to provide a constant voltage circuit having excellent constant voltage characteristics and a low thermal dissipation.

Other objects, features, and advantages of the present invention will become apparent from the following description taken in conjunction with the accompanying drawings.

DESCRIPTION OF THE PREFERRED EMBODIMENTS

Figure 1:
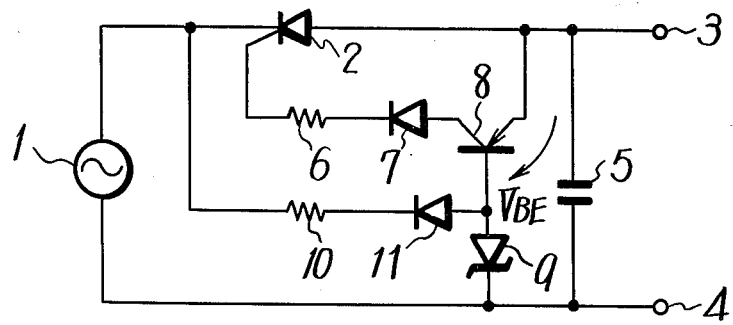
FIG. 1 is a schematic circuit diagram showing one embodiment of a constant voltage circuit according to the present invention.

In FIG. 1 an AC source 1 is connected to the cathode of a SCR 2 and the anode of the SCR is connected to a power supply output terminal 3. The other terminal of the source 1 is connected to a second power supply output terminal 4. A filtering capacitor 5 is connected between the output terminals 3 and 4. The gate supply circuit of the SCR 2 includes a resistor 6 connected in series with a diode 7 and the output, or emitter-collector, circuit of a PNP transistor 8. The emitter of the transistor 8 is connected to the output terminal 3 and to one end of the capacitor. A constant voltage zener diode 9 is connected between the base of the transistor 8 and the other power supply output terminal 4. A series circuit comprising a resistor 10 and a diode 11 is connected between the terminal of the alternating current source 1 to which the cathode of the SCR 2 is connected and the juncture of the base of the transistor 8 and the anode of the zener diode 9.

Figure 2:
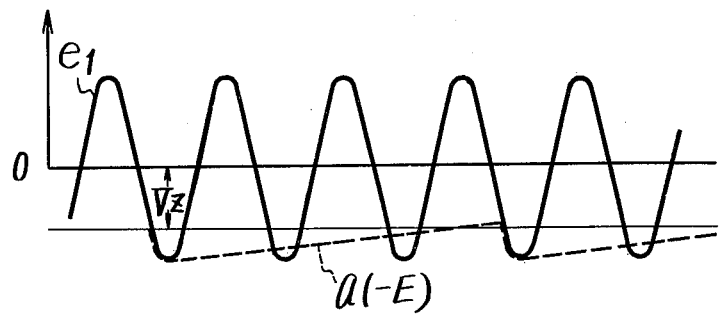
FIG. 2 is a graph used for explanation of the circuit shown in FIG. 1.

The operation of the circuit in FIG. 1 will be explained with reference to the wave form in FIG. 2. FIG. 2 is a graph of a sinusoidal voltage $e_1$, which is the output voltage of the AC source 1. The zener diode 9 has a constant voltage $V_Z$ and this voltage is connected between the base of the transistor 8 and the power supply terminal 4.

When the circuit is placed in operation and the voltage $e_1$ is negative, the transistor 8 becomes conductive and supplies gate current to the SCR 2 through the resistor 6 and the diode 7. This causes the SCR 2 to become conductive and to allow current to flow through it to charge the filter capacitor 5.

The maximum value E of the voltage $e_1$ is greater than the zener voltage $V_Z$ of the zener diode 9. The zener diode is polarized so that it operates during a negative part of the cycle of the voltage $e_1$. The diode 11 is polarized to be conductive during negative half-cycles of the voltage $e_1$ to allow the zener voltage $V_Z$ to be produced across the zener diode 9. The diode 11 is non-conductive during positive half-cycles to prevent inverse voltage from being applied across the zener diode 9 and thus to prevent an inverse current from flowing to the zener diode or to the base of the transistor 8;

The transistor 8 can only conduct when its emitter is positive with respect to its base. The dotted, sloped line a(−E) represents the voltage at the output terminal 3 with respect to the terminal 4 and, therefore, represents the discharge curve of the capacitor 5 following its initial charge to the value −E. During negative parts of cycles of the voltage $e_1$, the base of the transistor 8 is prevented by the zener diode 9 from going more negative than the zener voltage $V_Z$, so for several cycles after the charging half-cycle the transistor 8 is kept non-conductive. This prevents gate current from reaching the SCR 2 and keeps the SCR from conducting. The slope of the line a(−E) is determined by the load (not shown) connected across the terminals 3 and 4 and by the capacitance of the capacitor 5.

Eventually the line a(−E) reaches a point that indicates that the terminal 3 is less negative than the zener voltage $V_Z$, and so, during the next negative part of a cycle of the voltage $e_1$, the conditions are satisfied for making the transistor 8 conduct current to the gate of the SCR 2. When this happens, the SCR is again made conductive to recharge the capacitor 5. The charging of the capacitor is thus related to the fixed value of the zener voltage $V_Z$.

Figure 3:
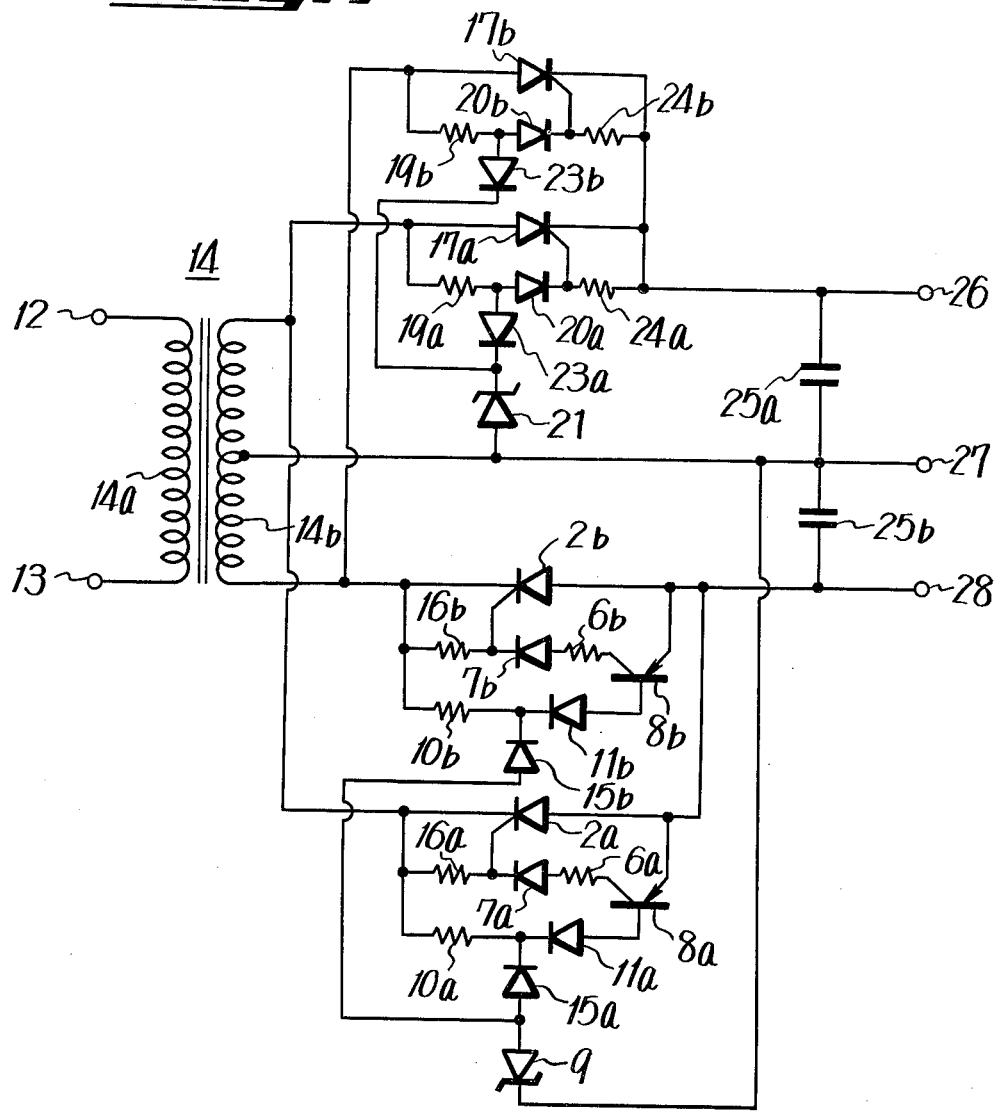
FIG. 3 is a schematic circuit diagram of a two-voltage system according to the present invention.

Before describing the circuit in FIG. 3, the circuit in FIG. 4 will be described, since the circuit in FIG. 3 is basically made up of two circuits similar to the one in FIG. 1 and two circuits similar to the one in FIG. 4.

Figure 4:
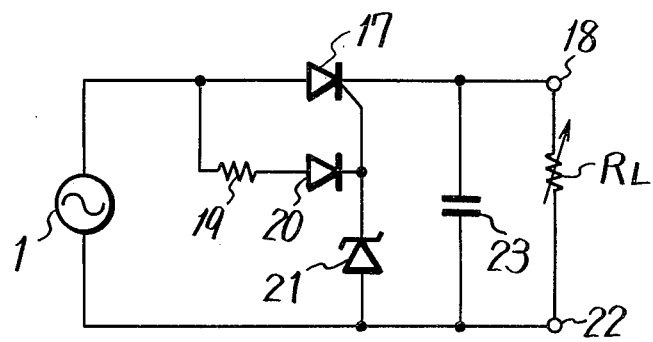
FIG. 4 is a schematic circuit diagram showing a constant voltage circuit according to the invention for providing a positive output voltage.

The circuit in FIG. 4 includes an SCR 17 that has its anode connected to one terminal of the AC source 1 and its cathode connected to an output terminal 18. Thus, the SCR 17 is connected in opposite polarity to the SCR 2 in FIG. 1. A series circuit consisting of a resistor 19, a diode 20 and a zener diode 21 is connected across the terminals of the AC source 1. An output terminal 22 is connected to the juncture of the zener diode 21 and the second terminal of the AC source 1. A filter capacitor 23 is connected across the terminals 18 and 22, as is a load represented by a variable resistor $R_L$.

In keeping with the polarity of current through the SCR 17, the diode 20 and the zener diode 21 are connected in opposite polarity from the diode 11 and the zener diode 9 in FIG. 1. There is no need for a transistor in the gate circuit of the SCR 17 in FIG. 4, but instead, the gate of the SCR 17 is connected to a common circuit point of the series circuit that includes the resistor 19, the diode 20 and the zener diode 21. Specifically, in FIG. 4 the gate of the SCR 17 is connected to the juncture of the diode 20 and the zener diode 21.

Figure 5:
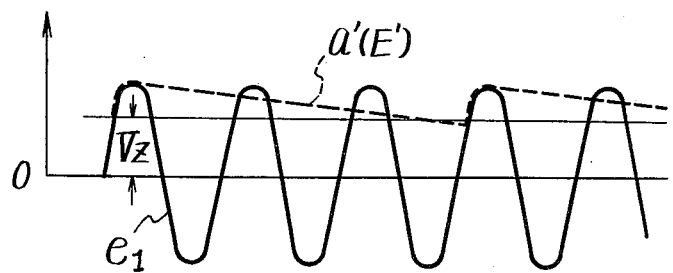
FIG. 5 shows a graph used for explanation of the operation of the circuit in FIG. 4.

The operation of the circuit in FIG. 4 will be described with reference to FIG. 5 in which the sinusoidal wave $e_1$ again represents the output voltage of the source 1 and $V_Z$ is the zener voltage of the zener diode 21. With the SCR 17, the diode 20, and the zener diode 21 polarized as shown, the output terminal 18 is positive with respect to the terminal 22. Basically, the gate-cathode circuit of the SCR 17 measures the difference between the voltage $e_1$ and the zener voltage $V_Z$. The gate of the SCR can receive turn-on current only when the gate is positive with respect to the cathode. As is shown in FIG. 5, the SCR 17 is conductive in the first positive half-cycle of the voltage $e_1$ and charges the capacitor to the maximum value $E'$. Then the capacitor discharges through the load $R_L$ as indicated by the line $a'(E')$. Eventually the capacitor voltage represented by the line $a'(E')$ drops below the zener voltage $V_Z$, and the gate of the SCR 17 becomes positive with respect to the cathode. On the next positive half-cycle of the voltage $e_1$, current is able to flow through the SCR to recharge the capacitor 23.

FIG. 3 is a two-voltage circuit that is capable of producing a positive voltage using two circuits similar to the circuit in FIG. 4 in a full-wave rectifier configuration to produce a positive output voltage and two circuits similar to the circuit in FIG. 1 in a full-wave rectifier configuration to produce a negative voltage. The components that correspond to those in FIGS. 1 and 4 are identified by the same reference numbers, although most of the reference numbers have either the letter $a$ or the letter $b$ as a suffix.

In FIG. 3 an AC source similar to the source 1 in FIGS. 1 and 4 is connected across two terminals 12 and 13 of a transformer 14. The terminals 12 and 13 are connected to a primary winding 14a of the transformer. The transfomer also has a center-tapped secondary winding 14b connected to four rectifier circuits, which are arranged in two pairs.

The first pair is similar to the single circuit in FIG. 1. The cathodes of the SCRs 2a and 2b are connected to opposite ends of the center-tapped secondary, which is the equivalent of two AC sources having mutually opposite alternating voltages. The two transistors 8a and 8b are both connected to the same zener diode 9 by respective diodes 15a and 15b, and the zener diode is connected to the center-tap of the secondary 14b. The cathode of the diode 15a is connected to a common circuit point between the resistor 10a and the diode 11a, and the cathode of the diode 15b is similarly connected to a common circuit point between the resistor 10b and the diode 11b. A leak resistor 16a is connected between the gate and cathode of the SCR 2a and another leak resistor 16b is similarly connected to the cathode and gate of the SCR 2b.

Each of the other two rectifier circuits is similar to the circuit in FIG. 4. Instead of connecting the anodes of the SCRs 17a and 17b to an AC source, they are connected to opposite ends of the transformer secondary 14b, the same points to which the cathodes of the SCRs 2a and 2b are connected. The gates of the two SCRs 17a and 17b are connected to a single fixed voltage device, the zener diode 21, which is connected to the center-tap of the secondary 14b, and two diodes 23a and 23b connect the zener diode to the gate circuits of the SCRs 17a and 17b, respectively. The anodes of the diodes 23a and 23b are connected to common circuit points between the resistors 19a and 19b and the diodes 20a and 20b, respectively. The circuit also includes two leak resistors 24a and 24b, each of which is connected between the gate and cathode of the respective one of the SCRs 17a and 17b.

The cathodes of both of the SCRs 17a and 17b are connected together at one terminal of a filter capacitor 25a and to a positive voltage output terminal 26. The center-tap of the secondary 14b is connected to an intermediate voltage output terminal 27, which may be connected to ground. The anodes of the SCRs 2a and 2b are connected together to a third output terminal 28 that is negative with respect to the terminal 27. Another filtering capacitor 25b is connected between the terminals 27 and 28.

Figure 6A:
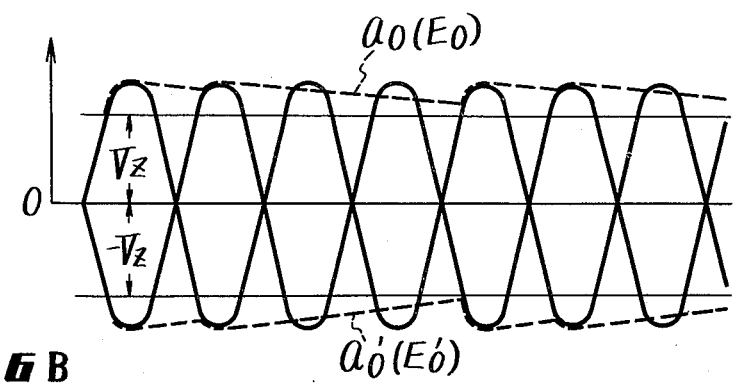
FIGS. 6A-6C are graphs used for explanation of the operation of the circuit in FIG. 3.
Figure 6B:
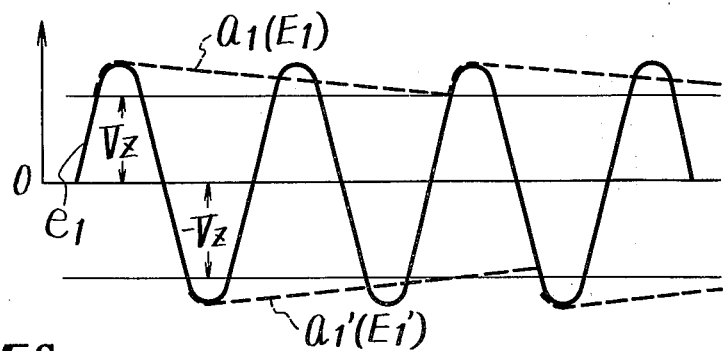
Figure 6C:
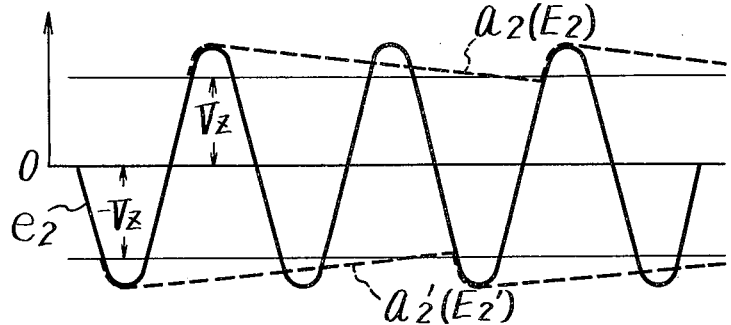

Operation of the circuit in FIG. 3 will be described with reference to FIGS. 6A–6C. FIG. 6B shows an alternating voltage $e_1$ between the upper end of the secondary 14b and the center-tap. The SCR 17a connected to receive this voltage produces a rectified voltage in exactly the same manner as the SCR 17 in FIG. 4. The rectified voltage charges the capacitor 25a and the voltage across the capacitor follows the curve $a_1$-$(E_1)$. The diode 23a does not affect the operation of the circuit to make any substantial difference from the operation of the circuit in FIG. 1. The diode 23a simply prevents reverse current from flowing to a zener diode 21.

At the same time, the SCR 2a is producing a negative half-wave rectified voltage that causes the charge on the capacitor 25b to follow the curve $a_{1'}$ ($E_{1'}$ ) in FIG. 6B. The diode 15a, like the diode 23a protects the zener diode to which it is connected from receiving reverse current.

While the SCRs 17a and 2a are being energized by voltage of one half of the secondary 14b, the SCRs 17b and 2b are being energized by the other half of the secondary. The SCRs 17b and 2b, and the respective components connected to them respond to the voltage $e_2$ of the other half of the secondary 14b as shown in FIG. 6C, which is identical with FIG. 6B except that the voltage $e_2$ is 180° out of phase with respect to the voltage $e_1$. As a result, the times of conductivity of the SCRs 17a and 17b cannot be identical nor can the times of conductivity of the SCRs 2a and 2b. The combined curves are shown in FIG. 6A in which the curve $a_0(E_0)$ represents the voltage at the terminal 26 controlled by the zener diode 21, which is common to and controls both of the SCRs 17a and 17b.

In a similar manner the negative voltages at the anodes of the SCRs 2a and 2b combine to produce the output voltage $a_{0'}$ ($E_{0'}$ ).

Figure 7:
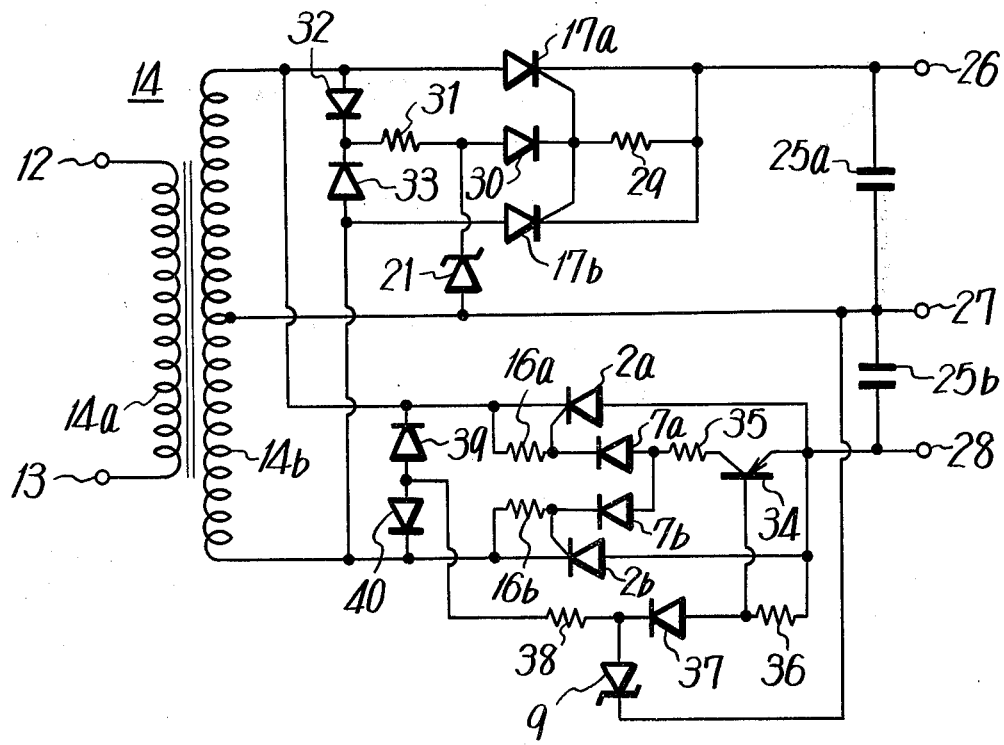
FIG. 7 is a schematic circuit diagram showing another embodiment of the present invention.

FIG. 7 is a two-voltage circuit similar to FIG. 3 but with a rearrangement that simplifies the circuit and reduces the number of components. The components in FIG. 7 that correspond to those in FIG. 3 are identified by the same reference characters.

As in FIG. 3 the circuit in FIG. 7 shows the anodes of the SCRs 17a and 17b connected to opposite ends of the center-tapped secondary 14b. The circuit in FIG. 7 has only a single leak resistor 29 connected across the parallel-connected gates and cathodes of both SCRs 17a and 17b and a single diode 30 connecting both gates to the cathode of the zener diode 21. A single resistor 31 is connected to the zener diode, but two diodes 32 and 33 are still required to allow current to flow toward the zener diode only when the voltages at the ends of the secondary have the proper polarity with respect to the center-tap.

The negative voltage section of the circuit has also been simplified. A single PNP transistor 34 performs the switching function to control the gate turn-on current for both of the SCRs 2a and 2b, and the turn-on current flows through a common resistor 35, but two diodes 7a and 7b are required to prevent inverse currents from flowing through the gates. A leak resistor 36 is connected between the base and emitter of the transistor 34.

A single diode 37 connects the base of the transistor 34 to the zener diode 9, and a single resistor 38 is connected to the zener diode, but two diodes 39 and 40 are required to prevent inverse current from reaching the zener diode 9 in the same manner that the diodes 32 and 33 prevent inverse currents from reaching the zener diode 21.

In operation the SCRs 17a and 17b form one full-wave rectifier and the SCRs 2a and 2b form another of opposite polarity. The voltages at the output terminals 26 and 28 are identical to those in the circuit in FIG. 3 and are also represented by the curves $a_0(E_0)$ and $a_0'(E_0')$ in FIG. 6A. The circuit in FIG. 7 has one less transistor, two less diodes, and three less resistors than the circuit in FIG. 3 to produce the same results.

While this invention has been described in terms of specific embodiments, it will be understood by those skilled in the art that modifications may be made therein without departing from the true scope of the invention.

What is claimed is:
1. A power supply circuit comprising:
A. first and second input terminals to be connected to an alternating voltage source;
B. first and second output terminals, said second input terminal being connected to said second output terminal;
C. thyristor switching means comprising a first electrode connected to said first input terminal, a second electrode connected to said first output terminal, and a third electrode;
D. semiconductor switching means comprising a first electrode connected to said first output terminal, and second and third electrodes;
E. a first impedance connecting said second electrode of said semiconductor switching means to said third electrode of said thyristor switching means;
F. a second impedance connecting said third electrode of said semiconductor switching means to said first input terminal;
G. a series circuit comprising constant voltage means connecting said third electrode of said semiconductor switching means to said second output terminal; and
H. a capacitor connected in series between said output terminals.

2. The power supply circuit of claim 1 in which said thyristor switching means is a silicon controlled rectifier and said semiconductor switching means is a transistor.

3. The power supply circuit of claim 1 in which said first impedance comprises a diode polarized to carry turn-on current to said third electrode of said thyristor switching means.

4. The power supply circuit of claim 1 in which said second impedance comprises a diode polarized to prevent the flow of inverse current to said third electrode of said semi-conductor switching means.

5. The power supply circuit of claim 1 comprising, in addition:
A. a third input terminal to be connected to an alternating voltage source of the opposite polarity from said first-named alternating voltage source;
B. second thyristor switching means comprising a first electrode connected to said third input terminal, a second electrode connected to said first output terminal, and a third electrode;
C. second semiconductor switching means comprising a first electrode connected to said first output terminal, and second and third electrodes;
D. a third impedance connecting said second electrode of said second semiconductor switching means to said third electrode of said second thyristor switching means;
E. a fourth impedance connecting said third electrode of said second semiconductor switching means to said third input terminal; and
F. a second series circuit connecting said third electrode of said second semiconductor switching means to said constant voltage means.

6. The power supply circuit of claim 5 in which said first-named series circuit further comprises a diode polarized to prevent the flow of inverse current through said constant voltage means.

7. The power supply circuit of claim 6 in which said second series circuit comprises a second diode polarized to prevent the flow of inverse current through said constant voltage means.

8. The power supply circuit of claim 1 comprising, in addition:
A. a third input terminal to be connected to an alternating voltage source of the opposite polarity from said first-named alternating voltage source;
B. second thyristor switching means comprising a first electrode connected to said third input terminal, a second electrode connected to said first output terminal, and a third electrode;
C. a third impedance connecting said second electrode of said first semiconductor switching means to said third electrode of said second thyristor switching means; and
D. a fourth impedance connecting said third electrode of said second semiconductor switching means to said third input terminal.

* * * * *